United States Patent [19]

Masuda

[11] Patent Number: 4,667,719

[45] Date of Patent: May 26, 1987

[54] NON-SKID ICE AND SNOW TREAD CONFIGURATION FOR PNEUMATIC VEHICLE TIRES

[76] Inventor: Koji Masuda, 43-15 Takashimadaira-1, Itabashi-ku, Tokyo 175, Japan

[21] Appl. No.: 732,870

[22] Filed: May 10, 1985

[51] Int. Cl.⁴ ............................................. B60C 11/10
[52] U.S. Cl. ................................................ 152/209 R
[58] Field of Search ........................ 152/209 R, 209 D; D12/139

[56] References Cited

U.S. PATENT DOCUMENTS

| D. 51,435 | 10/1917 | Beckwith | D12/139 |
| D. 263,392 | 3/1982 | Vande Walker | D12/139 |
| D. 929,632 | 7/1909 | Sanford et al. | 152/209 R |
| 1,468,439 | 9/1923 | Cozakos | 152/209 R |
| 2,004,036 | 6/1935 | Coenning | 152/209 R |

FOREIGN PATENT DOCUMENTS 2405828  6/1979  France .............................. 152/209 D

*Primary Examiner*—Michael Ball
*Attorney, Agent, or Firm*—Allston L. Jones

[57] ABSTRACT

An improved non-skid tread configuration for vehicle tires. The tread design including a plurality of suction means spaced-apart in all directions around the circumference of the tread portion of the tire for providing improved resistance in all directions to skidding on ice or snow.

4 Claims, 3 Drawing Figures

NON-SKID ICE AND SNOW TREAD CONFIGURATION FOR PNEUMATIC VEHICLE TIRES

BACKGROUND AND SUMMARY OF THE INVENTION

This invention relates to pneumatic tires, and more particularly, to an improved tire for use on ice or snow covered roadways.

As the tread portion of a pneumatic tire travels through the footprint with the roadway, many different forces are experienced. Under normal dry road conditions, the principal lateral force experienced by the tread portion of the tire is the longitudinal force parallel to the direction of travel of the tire. The lateral force experienced by the tread portion under dry road conditions is generally so small when compared to the longitudinal force to be of any major consequence. However, ice and snow covered roadways present a substantially reduced coefficient of friction between themselves and the tread portion of the tire. As a result, lateral stability of the tread portion of the tire is of increased importance.

To obtain the increased lateral stability necessary to operate a motor vehicle on an ice or snow covered roadway, various non-skid devices using hardened metals have been devised. These include tire chains and studs inserted into the tread portion of a tire. The tire chains are inconvenient since one must stop the vehicle and install the chains on the driven wheels when necessary. This is time consuming and must be done in freezing weather conditions beside the roadway. In addition, the use of chains forces the driver to proceed at a slower speed than he might otherwise be able to travel due to the uncomfortable ride chain equipped tires provide. Another undesirable feature of tire chains is their potential to damage the body of the vehicle on which they are mounted if they break while traveling.

Tire chain or stud equipped tires when used on roadway surfaces that are clear of ice and snow present several undesirable side-effects. Not only are they noisier than tires not so equipped, they also cause physical damage to the surface of the roadway when the hardened metal strikes it. Small pieces of the roadway are broken free by such impact which not only increase the maintenance costs of the roadway but also presents dust pollution which is an increasingly serious social and environmental problem.

To overcome these problems, it is desirable to have a tire with a tread design which offers a non-skid footprint pattern which is resistant to forces in all directions without the use of hardened metal devices. The present invention provides such a tread design.

In accordance with the illustrated embodiments, the present invention provides a pneumatic ice and snow tire for a vehicle having a tread that includes a roadway bearing surface having defined therein a plurality of spaced-apart means for establishing suction between the tread and ice and snow on a roadway.

DETAILED DESCRIPTION OF THE PREFERRED EMBODIMENTS

The tread configuration of both embodiments of the present invention is characterized primarily in that the radially outwardly located peripheral roadway bearing surface of the tire includes two linear arrays of suction members which may be produced by any of a number of well-known tire molding techniques for tires of several contruction styles.

Figure 1:
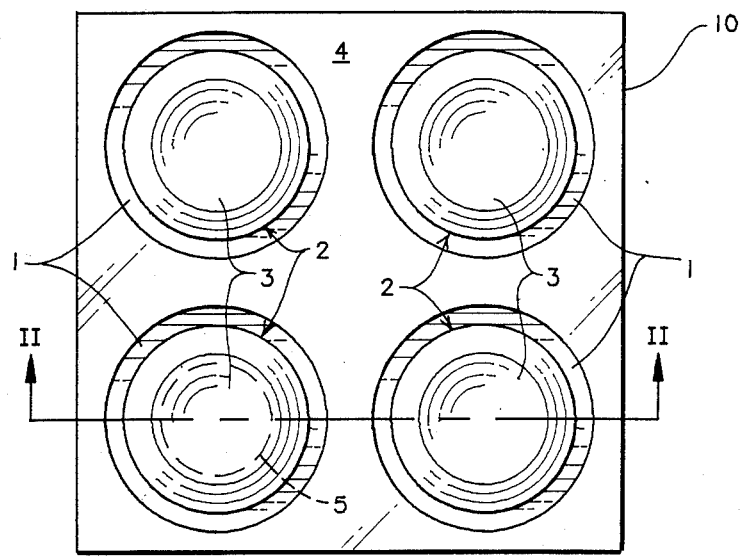
FIG. 1 is a schematic fragmentary plan view of an outer peripheral surface of one embodiment of the non-skid tire of the present invention.
Figure 2:
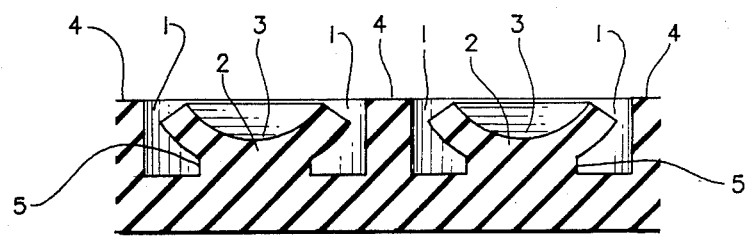
FIG. 2 in a cross-sectional view of the tire tread portion of the tire surface shown in FIG. 1 taken along line II—II.

Referring to FIGS. 1 and 2, there is shown a first embodiment of tread design of the present invention. In FIG. 1, the footprint 10 of this tread design is illustrated with the outer surface 4 of the tread incorporating a plurality of spaced-apart circular or annular cavities or grooves 1. Each of grooves 1 set off and surround an island 2 from the tread surface 4 with each island 2 having a concave suction member 3.

In FIG. 2, the cross-section of the tread design of FIG. 1 reveals several other of the features of this design. Thus, each cavity or groove 1 includes an outer annular wall extending radially inwardly of the tire from the roadway surface, which merges into an annular bottom wall of the cavity. Each island 2 includes a radially outwardly extending pedestal portion 5 to space the rear wall of the suction member 3, mounted thereon, away from the bottom wall of groove 1. In addition, each of pedestals 5 have a smaller cross-sectional area than the surface area of suction member 3, when viewed perpendicularly to the outer surface 4 as in FIG. 1, to allow more flexibility in the outer rim of suction member 3. Further, suction member 3, is concave with its center area extending toward the inside of the tire away from outer surface 4 with its outer rim even with or slightly recessed from outer surface 4 and in spaced relation to said annular cavity wall. Groove 1 is also shown in FIG. 2 as being substantially "L" shaped and surrounding island 2.

By recessing at least the center area of suction member 3 from the outer surface 4 of the tire, the load weight and wear presented to suction member 3 is reduced. This provides for longer tire wear by extending the life of suction members 3 and their ability to seal with and hold to ice and snow. By recessing suction members 3, they will not wear unnecessarily when the roadway is free of ice and snow.

Figure 3:
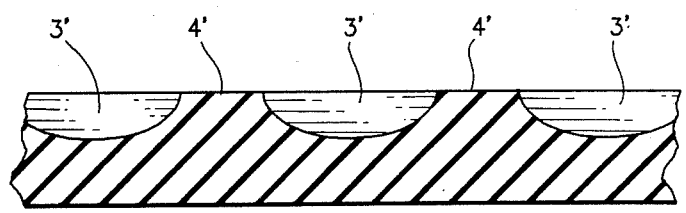
FIG. 3 is a cross-sectional view of a tire tread portion of a tire incorporating an alternate embodiment of the present invention.

The alternate embodiment of the present invention as shown in FIG. 3 includes a tread portion of a tire having an outer surface 4' with concave suction members 3' moulded therein. This configuration operates similarly to that of the first embodiment.

From the foregoing description, it will be apparent that the invention disclosed herein provides a tire with a novel non-skid tread pattern for use on ice and snow. As will be understood by those familiar with the art, the invention may be embodied in other specific forms without departing from the spirit or essential characteristics thereof. By way of example, one could substitute any polygonal shape for the circular suction members 3 or pedestals 5.

What is claimed is:

1. A non-skid tread pattern configuration for a pneumatic vehicle tire for providing improved traction between the tread foot print and the roadway in all directions when ice and snow are present, said tread pattern comprising
- a roadway bearing surface having a plurality of laterally adjacent spaced annular cavities therein about the circumference thereof,
- each said cavity being defined by a radially inwardly extending annular wall merging at its inwardmost point into an annular recessed bottom wall,
- an upstanding radially outwardly extending pedestal disposed centrally of said bottom wall and in laterally spaced relation to said cavity annular wall, and,
- a suction cup carried by said pedestal, said cup having a radially outwardly facing concave surface terminating at its periphery in an annular rim disposed in laterally spaced relation to said cavity annular wall, said rim merging into a downwardly and radially inwardly extending annular rear suction cup wall connected to the said pedestal, and wherein said rim extends radially outwardly no further than said roadway bearing surface.

2. The tire tread pattern of claim 1 wherein said suction cup annular rim is entirely disposed radially inwardly of said roadway bearing surface.

3. The tire tread pattern of claim 1 wherein said cavities and suction cups are disposed in a plurality of rows about the tire roadway bearing surface.

4. The tire tread pattern of claim 3 wherein said cavities in said respective rows are in aligned side-by-side position about the roadway bearing surface.

* * * * *